United States Patent [19]
Prairie et al.

[11] Patent Number: 6,047,652
[45] Date of Patent: Apr. 11, 2000

[54] SEED PLANTER DISTRIBUTION SYSTEM

[75] Inventors: Douglas Samuel Prairie; Bradley John Meyer; Timothy Allen Murray; Eugene Irving Breker, all of Fargo, N. Dak.

[73] Assignee: Case Corporation, Racine, Wis.

[21] Appl. No.: 09/076,225

[22] Filed: May 12, 1998

[51] Int. Cl.[7] .................................................. A01C 7/00
[52] U.S. Cl. .................... 111/174; 406/146; 406/124; 406/181; 406/41
[58] Field of Search .................... 111/170, 171, 111/174, 175, 176, 177; 406/141, 142, 143, 146, 124, 120, 181, 41; 222/630, 195

[56] References Cited

U.S. PATENT DOCUMENTS

| | | | |
|---|---|---|---|
| 2,708,605 | 5/1955 | Guise et al. ............................ | 406/181 |
| 4,082,364 | 4/1978 | Krambrock .............................. | 406/143 |
| 4,453,866 | 6/1984 | Ryan ..................................... | 406/144 X |
| 4,514,114 | 4/1985 | Fuss et al. ............................ | 406/146 X |
| 4,562,968 | 1/1986 | Widmer et al. ....................... | 111/175 X |
| 4,843,983 | 7/1989 | Olson ..................................... | 111/174 |
| 4,872,785 | 10/1989 | Schrage et al. ....................... | 111/174 |
| 5,161,473 | 11/1992 | Landphair et al. .................... | 111/176 |
| 5,265,547 | 11/1993 | Daws ..................................... | 111/175 |
| 5,379,706 | 1/1995 | Gage et al. ............................ | 111/175 |

FOREIGN PATENT DOCUMENTS

| 1017194 | 5/1983 | U.S.S.R. ............................... | 111/175 |
|---|---|---|---|

*Primary Examiner*—Victor Batson
*Attorney, Agent, or Firm*—Richard A. Speer; Mayer Brown & Platt

[57] ABSTRACT

A seed planter distribution system for transporting seeds from a source into a plurality of seed metering bins, the system including a manifold duct and a plurality of seed flow diverting structures that extend from the manifold into each metering bin, whereby each metering bin is filled in accordance with the flow of air available thereto.

12 Claims, 3 Drawing Sheets

SEED PLANTER DISTRIBUTION SYSTEM

BACKGROUND OF THE INVENTION

1. Field of the Invention

The present invention is concerned generally with agricultural implements and more specifically to an improved apparatus and method for transferring agricultural seed or other particulate material from a principal storage site to individual material metering hoppers mounted on planters, grain drills and the like.

2. Background

In the past, distribution of seed (or other particulate material such as fertilizer) for use in a variety of agricultural operations has been effected with the use of a plurality of row dispensing bins each of which has an associated metering device for applying pre-selected quantities of the seed or other particulate material to the land. These individual bins generally had limited storage capacity, for example 1 to 3 bushels and therefore required frequent refilling, which filling, if is effected from a fixed storage tank site, increased the overall planting time. Subsequent in time, the "down" time that occurred because of the use of fixed site storage tanks was basically eliminated by the development of apparatus in which a central supply of material was carried on the mobile equipment so that the dispensing bins could be resupplied with material during operation in the field. A seed distribution system in which grain is conveyed from an equipment-mounted main hopper can be seen in U.S. Pat. No. 5,161,173 issued Nov. 10, 1992 and assigned to Deere and Company. This system utilizes a single main hopper which dispenses seed to a plurality of individual or mini-hoppers that each, in turn, supply seed to an individual planting row. The seed is fed from the main hopper into each mini-hopper by entraining it in an airstream contained in separate, individual transfer hoses that are connected between the main tank and each of the individual mini-hoppers.

U.S. Pat. No. 5,379,706, issued Jan. 10, 1995 and assigned to Agco Corporation, is illustrative of another seed transporting system which also utilizes a central storage hopper for supplying a plurality of smaller, satellite hoppers via a plurality of individual hoses or tubes running from the central hopper to each of the individual satellite, row hoppers. Thus, while the systems of the 'BM73 and '706 patents provide for the maintenance of seed supply quantities in the row hoppers during seeding operations, they also require the incorporation of a large number of separate seed transport tubes in those systems where multiple, mini-hoppers are present. Since the requirement that multiple, individual seed feeding tubes to supply the dispensing hoppers may involve higher initial equipment costs and also increased maintenance costs, a more efficacious system would be one where the seed supply tube from the main tank are kept to a minimum.

BRIEF SUMMARY OF THE INVENTION

Whereas previously existing agricultural seed distribution systems for filling individual row seed bins have involved the use of individual supply hoses that extend from the seed source to each row bin, the present invention is designed to provide delivery of preselected quantities of seed to the separate row bins by means a single manifold transfer duct. The manifold duct is connected to a seed supply source at one end and has a plurality of flow diverting means located at predetermined, serial locations along its length. Each flow diverting means is connected to the interior of the manifold duct and extends downwardly into an underlying row bin to deliver seed from the duct to the bin. Advantageously, the manifold duct is constructed of sections which are joined end to end by the flow diverting means and the sections are each curved so that when assembled the mid-portion of each section is located vertically higher from the distribution bins than are its ends. When seed is pneumatically introduced into the manifold duct from the main supply hopper during planting operations, it initially flows through the first manifold section in an upwardly directed path and then downwardly toward the first flow diverter and on into the first of a series of row bins. The generally curved shape of each section comprising the overall manifold duct create a somewhat sinuously shaped flow path having upper and lower nodes, the lower nodes being located at each diverter location. After the seed in the first row bin reaches some desired level, which level can be varied, the outlet end of the flow diverter becomes blocked by the seed and the air borne seed in the manifold duct is caused to flow onward to a second distribution bin. In this manner, each seed distribution bin is filled in sequence until all are filled, thereby causing interruption of air and seed flow from the source. At any time the level of the grain in the distribution bins drops low enough to again permit air flow, the bins will automatically receive additional grain.

DETAILED DESCRIPTION

Figure 1:
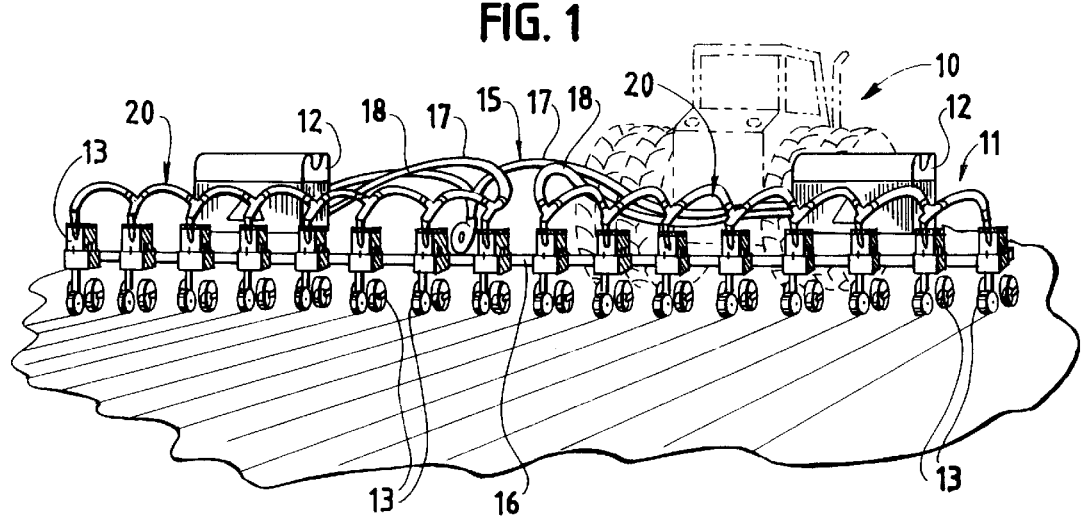
FIG. 1 is a schematic illustration showing how the material transporting apparatus of this invention is used in conjunction with agricultural equipment.
Figure 4:
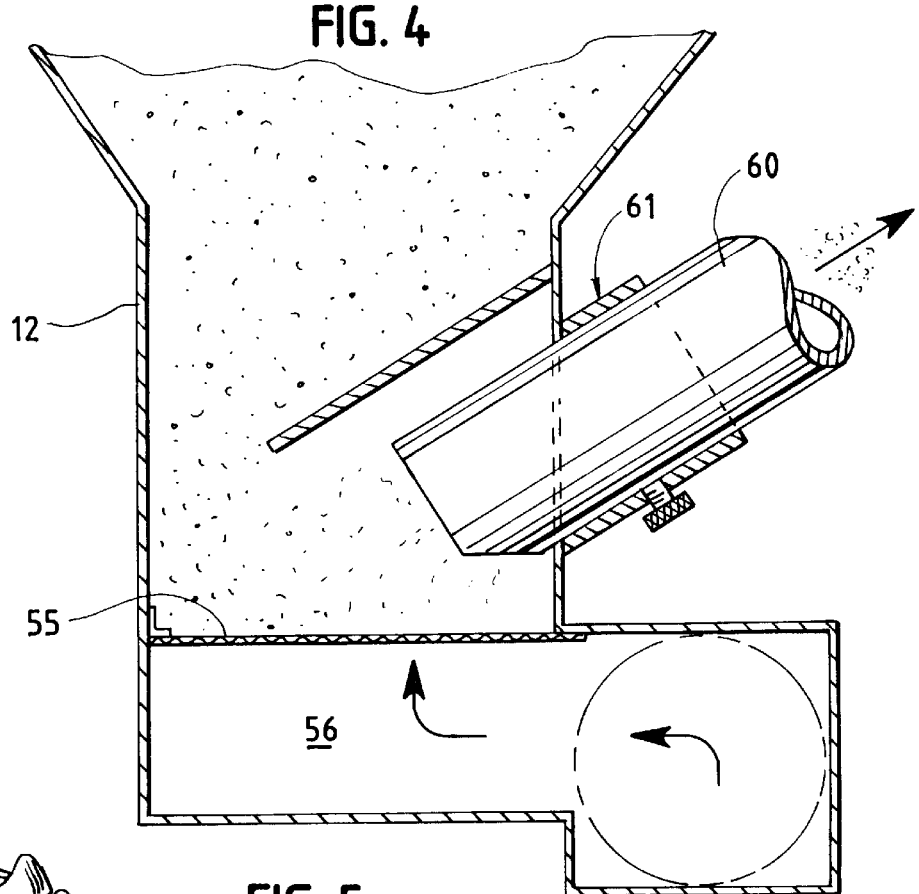
FIG. 4 is partial sectional view of a portion of the supply bin showing how material is directed into the transport system.

For a more complete understanding of the invention, reference is made to the drawings and initially to FIG. 1, which shows the pneumatic seed transporting system of this invention as it would be used in conjunction with an agricultural planter or seeder. In FIG. 1, numeral 10 indicates an agricultural tractor to which a planter 11 may be connected for transport through a field. The planter or seeder 11, is shown as having two central storage or reservoir hoppers 12 and a plurality of individual distribution or row metering hoppers 13 that receive seed from the storage hoppers 12 by means of a distribution system indicated generally by the numeral 15. Generally speaking, central storage tanks 12 could have capacities ranging from 50 to about 340 bushels while the individual row bins would characteristically range from about 1 quart BM to 3 bushels in capacity. Each of the row metering bins 13 will have an associated seed metering device that applies the seed to the soil in a manner well-known in the art. Each seed transport duct 18 is connected to supply seed up to twelve individual row hoppers, so that in FIG. 1 the planting system is capable of sowing seed in twenty-four rows. However, each storage tank 12 can house up to 4 transport ducts 18. The ability of the present system to supply seed to a comparatively large number of row bins, up to 48 per tank, is facilitated by the design of a single seed transport duct that is connected to a hopper 12 at one end and which extends from there outwardly over a series of row bins. The delivery system includes a source of air, such as blower 16, that is connected by air supply tubes 17 to the bottom of storage hoppers 12. Air entering into the hopper 12 picks up seeds and pneumatically transports them through tubes 18 into the inlet ends of a manifold supply duct 20, as shown in FIG. 4 and discussed below.

Figure 2:
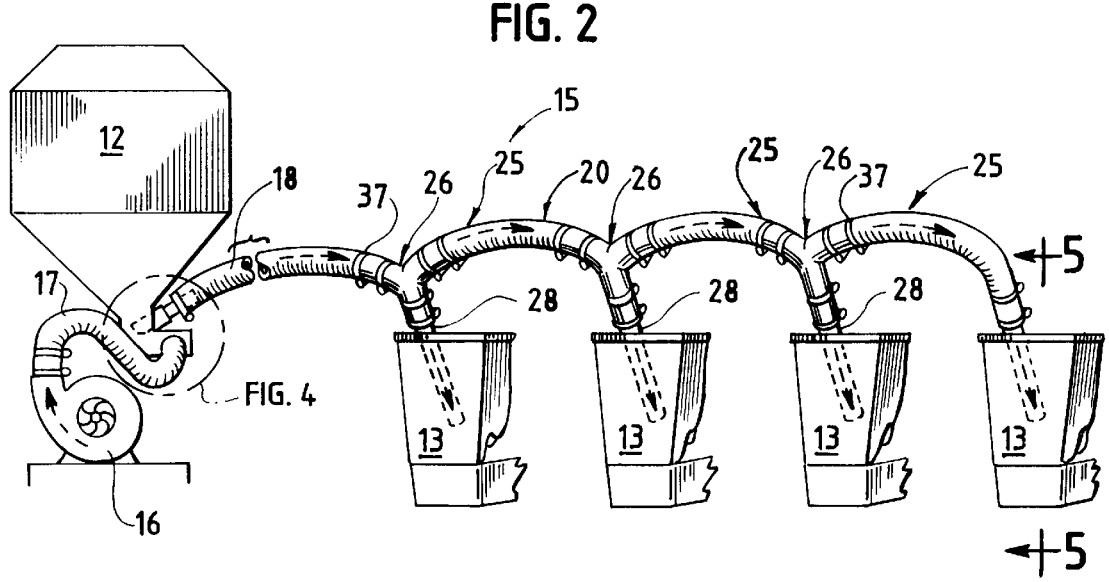
FIG. 2 is a schematic view showing the present apparatus design for transporting material from a supply bin to separate distribution bins.
Figure 3:
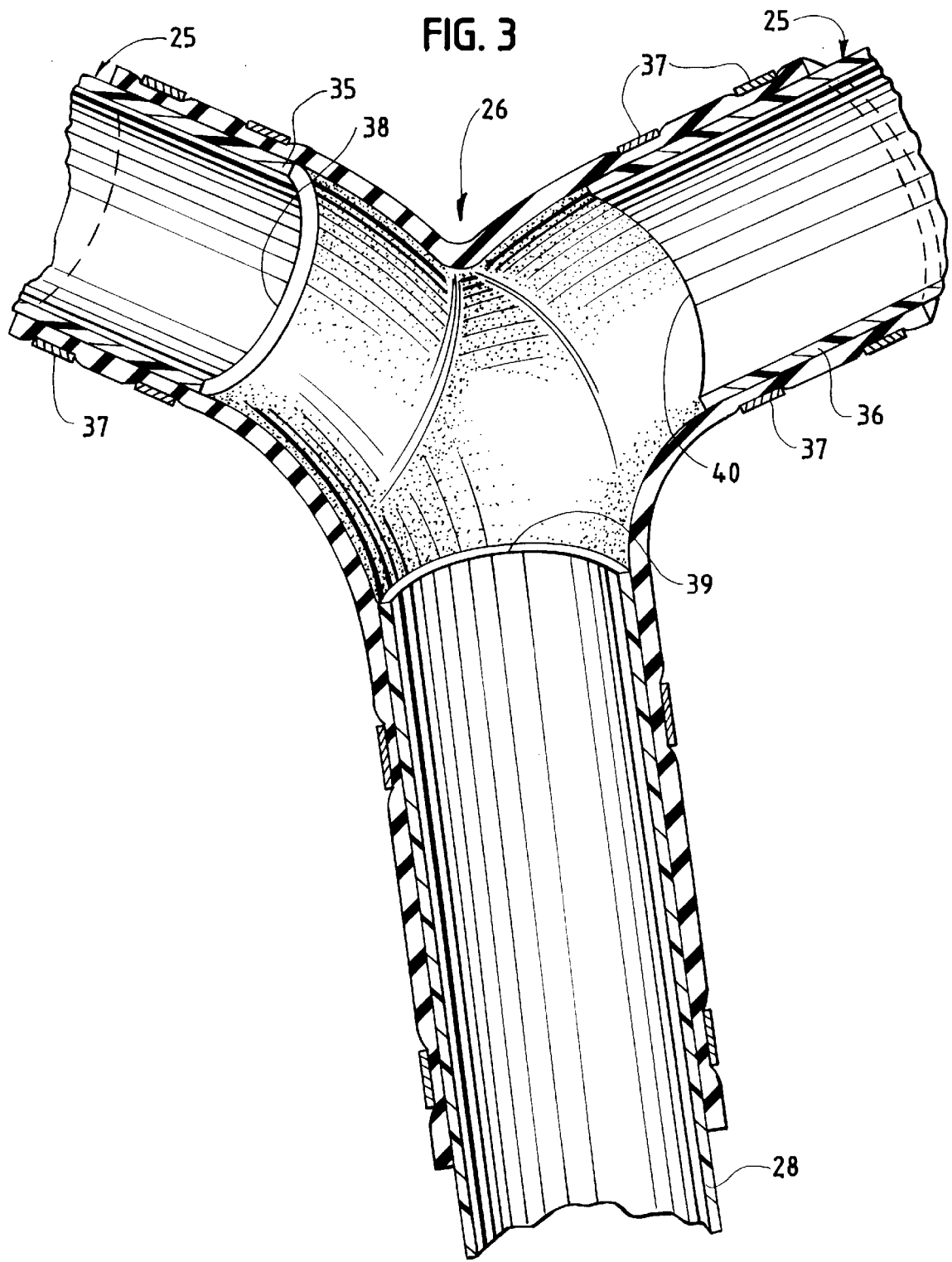
FIG. 3 is an enlarged sectional view of a flow diverter.

Referring now to FIG. 2 of the drawings it can be seen that the manifold duct 20 is comprised of a series of sections 25 that are joined at the inlet and outlet end of each section by seed flow diverting means 26. Sections 25 are configured in such a way that the midsection of is each section is located at an elevation that is further above the row bins 13 than are the ends thereof so that the outlet end of each section extends in a downward direction into the inlet 38 of a seed flow diverter 26 of generally Y-shaped configuration. Diverter 26 has a downwardly directed outlet 39 that can be used with a bin feed tube 28 which extends into the interior of the bins for the flow of seeds there into and diverter 26 has a second outlet opening 40 which extends upwardly for connection into the inlet side of the succeeding manifold section 25. (See. FIG. 3)

As best seen in FIG. 3, the Y-shaped diverter 26 is shown connected the outlet end 35 of a manifold section 25 and to the inlet end 36 of the following manifold section 25. The connection of diverter 26 to the outlet end 35 and inlet end 36 can be made with suitable fasteners such as hose clamps 37. Because of the diverter 26 configuration, it has an inlet opening 38, first outlet opening 35 and a second outlet opening 40, as set out above. As seed flows through the manifold section shown on the left in FIG. 3, it initially passes through the high point or upper node of the section 25 and then flows downwardly toward the outlet end 35 and into the inlet opening 38 of diverter 26. The shape of the diverter directs seed flow straight down into the outlet opening 39 and into bin feed tube 28. At the beginning of the bin filling operation virtually all of the seed coming from a hopper 12 will flow into the initial row bin, since the direction of seed flow in diverter 26 is towards opening 38.

Each of the manifold sections 25 is shaped in such a way that the mid portion of the section located between the inlet and outlet ends is located elevationally higher from the bins than are either the inlet or the outlet end. That is, the overall configuration of the manifold duct forms a defined passage that is roughly sinuous so that the intermediate portion of each section 25 defines a relatively higher node and the diverting means 26 which connects the outlet end of one section to the inlet section of the following section defines a relatively lower node in the passage. By providing an upwardly curved configuration in each section, material that is being advanced through the manifold 20 approaches the diverter means 26, in each instance, in a downwardly direction so that it will be caused to continue to flow downwardly into one of the underlying bins 13.

Figure 5:
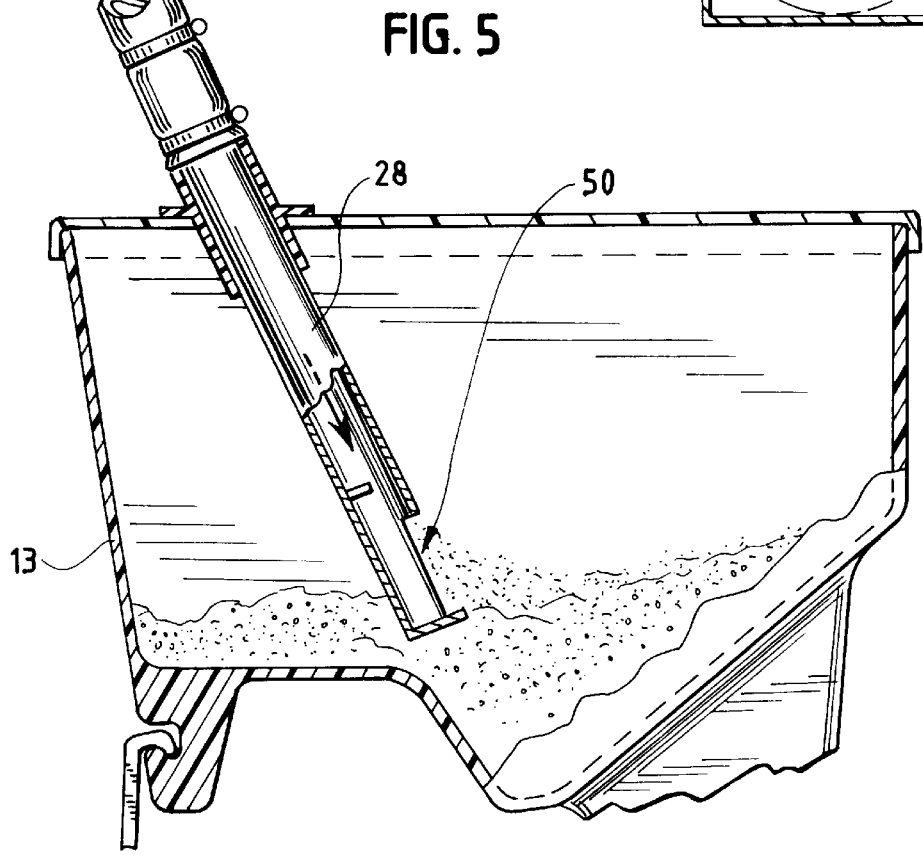
FIG. 5 is a side view, partially sectioned, illustrating the disposition of the outlet of a material diverter means in a distribution bin.

The diverter means 26 would usually include a bin filler tube 28 which extends downwardly into the associated bin and which may be adjusted as to how far into the bin they extend, in order that the quantity of seed introduced in the bin can be varied. That is, more or less seed can be caused to be placed into a bin, depending upon the quantity chosen by the operator to be sufficient in a particular application. FIG. 5 of the drawings shows the manner in which bin filler tube 28 can be located within the metering feed bin 13. Specifically tube 28 extends adjustably into the bin through the top thereof, the particular location not being of any particular significance and the seed flows into the bin through the opening 50. After sufficient seed grain has entered into the bin, the orifice or outlet opening 50 will become blocked by seed and further entry of seed into that bin will continue until seed reaches diverter 26. By adjusting the position of opening 50 either higher or lower within the bin 13, either greater or lesser quantities of stored grain can be held within each of the metering bins 13.

FIG. 4 of the drawings is an enlargement of the area encircled in FIG. 2 of the drawings, illustrating one means by which agricultural seed can be entrained by air and entered into the inlet opening of the first arcuate section 25 of manifold 20. In this drawing duct 17 is connected to the blower 16 (see FIG. 2) at one end and at the other end to the interior of hopper 12. The seed is held within the hopper 12 above screen or other foraminous material 55 which separates it from the air chamber 56 so that air can blow upwardly and entrain the grain and cause it to flow out the duct 18 and on into the first manifold section 25. Seed above screen 55 enters adjustable outlet tube 60 by means of the air flowing from blower 16 and through the screen. The distance at which the lower end of tube 60 is located with respect to screen 55 can be adjusted by the collar and nut arrangement 6 and the quantity of seed being entrained in the air varied proportionally.

In operation, the user of the present seed feeding apparatus will connect the inlet end of the first section 25 of the manifold structure 15, previously described, to a source 12 of agricultural seed. This source may either be stationary or carried on the planting apparatus, depending upon the user's preference. During the filling operation, the seed initially exits the storage container, for example, that identified as numeral 12 in the drawings and flows upwardly through the upper node or high point of a section 25 and then downwardly through the outlet exit end 35 of section 25 and through the first diverter means 26 into the first of the metering bins 13. After the first bin has become filled with grain and the grain has reached the bottom of first diverter 26, the air flow within which the seed is entrained will be carried outwardly through the other exit opening 40 of the first diverter 26 and into the inlet side of second section 25. Thereafter the filling process that occurred with respect to the first metering bin is repeated in the second metering bin until it is also filled. The identical operation will take place sequentially as each of the bins is filled until the last of the bins in the series is filled at which time no more grain is conveyed from the source to any of the bins. As grain is dispensed from the metering bins and an opening is no longer blocked by seed in the bin, air flow then resumes and the bin will be continuously refilled with the preselected quantity of seed.

The embodiments of the invention described and shown above are intended by way of example and are not intended to be limiting, as it will be apparent to those skilled in the art that various modifications can be made to the present invention without departing from spirt and scope of the invention.

What is claimed is:

1. Apparatus for pneumatically transporting agricultural seed from a source of air and seed into individual seed metering bins, the apparatus comprising:

(a) manifold duct structure of extended length having an intake opening to receive air borne seed from a source thereof, the duct being comprised of a plurality of interconnected curved duct sections; and (b) seed diverter structure interconnecting ends of the manifold duct sections, each diverter structure having a storage bin outlet and being configured to direct the air and seed from the manifold duct sections downwardly into the metering bins.

2. An apparatus as defined in claim 1 wherein each manifold section is shaped so that the ends thereof are vertically nearer to a metering bin than is the length of the section located between the ends.

3. Apparatus as defined in claim 1 wherein the seed diverter structure is configured to receive seed from a preceding manifold section and to direct it downwardly into an associated metering bin and into a following manifold section.

4. Apparatus as defined in claim 1 wherein the seed flow diverter structure includes a metering bin filler tube having an outlet end located within a metering bin.

5. Apparatus for pneumatically transporting agricultural seed from a source of air and seed into individual metering bins, the apparatus comprising:

(a) manifold duct structure comprised of a plurality of curved sections, each section having an inlet and an outlet end;

(b) seed flow diverter structure operably connecting successive ones of the curved sections to form a continuous manifold length, each flow diverter structure having an inlet opening to receive seed flow from a preceding manifold section and having an outlet opening for directing seed into a subsequent manifold section and into a metering bin.

6. Apparatus as defined in claim 5 wherein the seed flow diverter structure has at least three legs wherein a first leg is operably connected to a preceding manifold duct section to receive seed therefrom, a second leg is operably connected to a subsequent manifold duct section to pass seed thereunto and a third leg extends downwardly from a location intermediate the first and second legs into a metering bin.

7. Apparatus as defined in claim 6 wherein the flow diverter structure is of generally Y-shaped configuration.

8. Apparatus for pneumatically transporting agricultural seed from a source of air and seed into individual metering bins, the apparatus comprising:

(a) a central seed supply hopper.

(b) a plurality of individual metering bins mounted on an agricultural implement for movement through a field;

(c) manifold duct structure connected at an inlet end into the seed and air source and extending outwardly therefrom in a position generally above the metering bins, the duct being comprised of a plurality of interconnected curved duct sections;

(d) seed flow diverter structure interconnecting ends of the curved duct sections at locations above the metering bins.

9. In a process for the sequential filling of seed metering bins mounted on an agricultural seeding implement, the steps comprising:

(a) providing a source of seed and air;

(b) providing manifold duct structure that is operably connected to the seed and air source;

(d) providing seed diverter structure in the manifold duct structure at locations immediately above the metering bins, which diverter structure permits transports of seed through a manifold duct structure and into the bins;

(c) pneumatically transporting seed from the source through the manifold duct structure to fill a first metering bin with seed to a level that the seed diverter structure to the first bin is blocked;

(e) continuing the pneumatic transport of seed to fill sequentially each of the seed bins following the first bin by sequential blockage of each subsequent seed flow diverter structure.

10. In the process for the sequential filling of seed metering bins mounted on an agricultural seeding implement, the steps comprising:

(a) providing a seed transfer manifold duct system having a single elongated manifold duct extending above metering bins and a plurality of bin filler tubes that extend downwardly from the elongated manifold duct into an interior of each metering bin;

(b) providing a source of air and seed; and (c) creating a flow of air entrained seed in the manifold duct system, whereby each metering bin is filled in sequence.

11. Conveying apparatus for use in transporting agricultural seed from a central supply hopper to a plurality of seed metering bins, said apparatus comprising:

(a) an elongated manifold duct having a sinuous shape whereby seed is transported in a downward direction at locations spaced along the length of the duct; and (b) a grain feed tube operably connected to the manifold duct to direct the seed into a metering bin.

12. In an agricultural implement for distributing agricultural seed, the combination comprising:

(a) a central seed storage hopper;

(b) a plurality of metering bins to receive seed from the central seed storage hopper;

(c) a single, sinuously shaped manifold duct operably connected to the central storage hopper to receive seed therefrom, the manifold duct having relatively higher and relatively lower nodes wherein each lower node is located above an underlying metering hopper;

(d) a seed feed tube connected into each lower node to direct seed into the interior of an underlying metering bin; and (e) a source of air operably connected to the central storage hopper to transport seed from the storage hopper and through the manifold duct.

* * * * *